(12) United States Patent
Seidel et al.

(10) Patent No.: US 7,943,686 B2
(45) Date of Patent: May 17, 2011

(54) IMPACT-MODIFIED POLYCARBONATE COMPOSITIONS WHICH HAVE AN EMULSION GRAFT POLYMER PRECIPITATED UNDER BASIC CONDITIONS AND COMPRISE ACIDIC PHOSPHORUS COMPOUNDS

(75) Inventors: Andreas Seidel, Dormagen (DE); Evgueni Avtomonov, Leverkusen (DE); Thomas Eckel, Dormagen (DE)

(73) Assignee: Bayer Material Science AG, Leverkusen (DE)

( * ) Notice: Subject to any disclaimer, the term of this patent is extended or adjusted under 35 U.S.C. 154(b) by 0 days.

(21) Appl. No.: 12/629,342

(22) Filed: Dec. 2, 2009

(65) Prior Publication Data

US 2010/0144938 A1 Jun. 10, 2010

(30) Foreign Application Priority Data

Dec. 4, 2008 (DE) .............. 102008060536

(51) Int. Cl.
*C08K 5/524* (2006.01)
*C08K 3/32* (2006.01)
(52) U.S. Cl. ........ 524/117; 524/127; 524/140; 524/141; 524/148; 524/417
(58) Field of Classification Search .............. 524/117, 524/127, 140, 141, 148, 414, 417
See application file for complete search history.

(56) References Cited

U.S. PATENT DOCUMENTS

| | | | |
|---|---|---|---|
| 3,419,634 A | 12/1968 | Vaughn | |
| 3,553,167 A | 1/1971 | Schnell et al. | |
| 3,692,744 A | 9/1972 | Rich et al. | |
| 4,075,173 A | 2/1978 | Maruyama et al. | |
| 4,176,224 A | 11/1979 | Bier et al. | |
| 4,269,964 A | 5/1981 | Freitag et al. | |
| 4,311,823 A | 1/1982 | Imai et al. | |
| 4,334,053 A | 6/1982 | Freitag et al. | |
| 4,584,360 A | 4/1986 | Paul et al. | |
| 4,806,593 A | 2/1989 | Kress et al. | |
| 4,812,515 A | 3/1989 | Kress et al. | |
| 4,859,740 A | 8/1989 | Damrath et al. | |
| 4,861,831 A | 8/1989 | Damrath et al. | |
| 5,100,945 A | 3/1992 | Schmidt et al. | |
| 5,420,181 A * | 5/1995 | Eichenauer et al. | ............ 524/91 |
| 6,153,692 A | 11/2000 | Liesenfelder et al. | |
| 6,528,561 B1 | 3/2003 | Zobel et al. | |
| 2007/0135544 A1* | 6/2007 | Seidel et al. | .................. 524/284 |

FOREIGN PATENT DOCUMENTS

| | | |
|---|---|---|
| CA | 1100681 A1 | 5/1981 |
| DE | 3007934 A1 | 9/1981 |
| DE | 3832396 A1 | 2/1990 |
| EP | 0363608 A1 | 4/1990 |
| EP | 0576950 A2 | 1/1994 |
| EP | 0640655 A2 | 3/1995 |
| EP | 0 900 827 | 3/1999 |
| EP | 0900827 A2 | 10/1999 |
| GB | 1464449 | 2/1974 |
| WO | 00/00541 | 1/2000 |
| WO | 03/027165 | 4/2003 |
| WO | 2007/065579 A1 | 6/2007 |

OTHER PUBLICATIONS

International Search Report and Written Opinion based on PCT/EP2009/008299 dated Mar. 12, 2010.

* cited by examiner

*Primary Examiner* — Peter Szekely
(74) *Attorney, Agent, or Firm* — Baker Donelson Bearman, Caldwell & Berkowitz, PC

(57) ABSTRACT

The disclosure relates to impact-modified polycarbonate compositions and moulding compositions comprising
A) aromatic polycarbonate or aromatic polyester carbonate or mixtures of these,
B) a mixture containing
Ba) at least one graft polymer prepared in emulsion polymerization and
Bb) at least one carboxylate salt,
wherein this mixture, suspended as a 10 wt. % strength suspension in distilled water, has a pH of >7,
C) at least one acidic phosphorus compound with at least one P—OH functionality,
which are distinguished compared with the prior art by an improved combination of stability to hydrolysis and heat stability, and which are suitable for production of injection-moulded components which have a good toughness at low temperatures and—even with critical processing conditions (high processing temperatures)—still have a good resistance to stress cracking under the influence of chemicals.

16 Claims, No Drawings

IMPACT-MODIFIED POLYCARBONATE COMPOSITIONS WHICH HAVE AN EMULSION GRAFT POLYMER PRECIPITATED UNDER BASIC CONDITIONS AND COMPRISE ACIDIC PHOSPHORUS COMPOUNDS

CROSS-REFERENCE TO RELATED APPLICATION

This application claims priority from DE 102008060536 filed 2008 Dec. 4, the content of which is incorporated herein by reference in its entirety.

BACKGROUND OF DISCLOSURE

1. Field of the Disclosure

The disclosure relates to impact-modified polycarbonate compositions and moulding compositions comprising an emulsion graft polymer precipitated under basic conditions and acidic phosphorus compounds, which are distinguished compared with the prior art by an improved combination of stability to hydrolysis and heat stability, and which are suitable for production of injection-moulded components which have a good toughness at low temperatures and—even with critical processing conditions (high processing temperatures)—still have a good resistance to stress cracking under the influence of chemicals.

2. Description of Related Art

Emulsion graft polymers which are employed as impact modifiers in polycarbonate compositions of the prior art are in general worked up under acidic conditions, i.e. dispersions of such graft polymers in distilled water have an acidic pH. This is necessary in order to ensure an adequate heat stability of the polycarbonate compositions, since basic components as is known tend to thermally degrade the polycarbonate under processing conditions. Such polycarbonate compositions comprising emulsion graft polymers which have been precipitated under acidic conditions are often additionally stabilized during compounding by addition of acidic heat stabilizers. Such compositions as a rule indeed have a good heat stability, but in general they have a lack of stability towards hydrolytic cleavage of the polycarbonate under the influence of humid heat ageing.

EP-A 900 827 discloses impact-modified polycarbonate compositions with improved heat stability comprising emulsion polymers which are substantially free from any basic components which degrade the polycarbonate. According to this application, such polycarbonate compositions which are impact-modified with emulsion polymers which contain basic impurities due to the preparation have a lack of heat stability.

EP-A 576 950 and WO-A 2007/065579 describe compositions which contain basic impurities and comprise polycarbonate and acrylonitrile/butadiene/styrene (ABS) polymers, and are stabilized with multifunctional organic carboxylic acids. Such compositions have a good heat stability with respect to the integrity of the molecular weight of the polycarbonate component at high processing temperatures, but in injection moulding tend towards the formation of surface defects (streaks) on the mouldings produced from them.

SUMMARY OF THE DISCLOSURE

An object of the present disclosure was to provide polycarbonate compositions which are impact-modified with emulsion graft polymers and are distinguished by an improved combination of stability to hydrolysis and heat stability, and which are suitable for production of injection-moulded components which have a good toughness at low temperatures and—even under critical processing conditions (high processing temperatures)—still have a good resistance to stress cracking under the influence of chemicals.

It has now been found, surprisingly, that compositions and moulding compositions comprising A) an aromatic polycarbonate or aromatic polyester carbonate or mixtures of thereof,
B) a mixture comprising
    Ba) at least one graft polymer prepared in emulsion polymerization and
    Bb) at least one carboxylate salt (i.e. the salt of a carboxylic acid), preferably a salt of a carboxylic acid having 10 to 30 carbon atoms, of a resin acid or of a resin acid derivative, particularly preferably a salt of a resin acid or of a resin acid derivative,
wherein this mixture, suspended as a 10 wt. % strength suspension in distilled water, has a pH of >7, preferably of from 7.5 to 10, in particular from 7.5 to 9,
C) at least one acidic phosphorus compound with at least one P—OH functionality,
D) optionally a polymer chosen from the group of rubber-free vinyl (co)polymers, polyesters or rubber-modified vinyl (co)polymers prepared in bulk, solution or suspension polymerization, and
E) optionally polymer additives, may meet one or more of the abovementioned objects.

Additional objects, features and advantages of the disclosure will be set forth in the description which follows, and in part, will be obvious from the description, or may be learned by practice of the disclosure. The objects, features and advantages of the disclosure may be realized and obtained by means of the instrumentalities and combination particularly pointed out in the appended claims.

DETAILED DESCRIPTION OF A PREFERRED EMBODIMENT

In a preferred embodiment, a composition or moulding composition according to the present disclosure comprises A) 10 to 99.5 parts by wt., particularly preferably 30 to 80 parts by wt., in particular 40 to 75 parts by wt. (based on the sum of components A+B+D) of aromatic polycarbonate or aromatic polyester carbonate or mixtures of these,
B) 0.5 to 60 parts by wt., particularly preferably 1 to 50 parts by wt., in particular 3 to 30 parts by wt. (based on the sum of components A+B+D) of a mixture containing
    Ba) at least one graft polymer prepared in emulsion polymerization and
    Bb) at least one carboxylate salt, preferably a salt of a carboxylic acid having 10 to 30 carbon atoms, of a resin acid or of a resin acid derivative, particularly preferably a salt of a resin acid or of a resin acid derivative,
wherein this mixture, suspended as a 10 wt. % strength suspension in distilled water, has a pH of >7, preferably of from 7.5 to 10, in particular from 7.5 to 9,
C) 0.001 to 1 part by wt., particularly preferably 0.002 to 0.5 part by wt., in particular 0.005 to 0.3 part by wt. (based on the sum of components A+B+D) of at least one acidic phosphorus compound with at least one P—OH functionality,
D) 0 to 60 parts by wt., particularly preferably 0.5 to 40 parts by wt., in particular 5 to 40 parts by wt. (based on the sum of components A+B+D) of a polymer chosen from the group of vinyl (co)polymers, polyesters and rubber-modified vinyl (co)polymers which differ from component B, preferably prepared in bulk, solution or suspension polymerization, and E) 0 to 40 parts by wt., particularly preferably 0.1 to 30 parts by wt., in particular 0.5 to 20 parts by wt. (based on the sum of components A+B+D) of polymer additives, wherein all the parts by weight stated in the present application are standardized such that the sum of the parts by weight of components A+B+D in the composition is 100, and wherein components B and C are employed in the ratio of 30:1 to 2,000:1, preferably in the ratio of 50:1 to 1,500:1, particularly preferably in the ratio of 70:1 to 1,000:1, in particular in the ratio of 80:1 to 800:1.

Component A

Aromatic polycarbonates and/or aromatic polyester carbonates according to component A which are suitable according to the present disclosure are generally known from the literature or can be prepared by processes known from the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates e.g. DE-A 3 077 934).

Aromatic polycarbonates are prepared e.g. by reaction of diphenols with carbonic acid halides, preferably phosgene, and/or with aromatic dicarboxylic acid dihalides, preferably benzenedicarboxylic acid dihalides, by the interfacial process, optionally using chain terminators, for example monophenols, and optionally using branching agents which are trifunctional or more than trifunctional, for example triphenols or tetraphenols. A preparation via a melt polymerization process by reaction of diphenols with, for example, diphenyl carbonate is likewise possible.

Diphenols for the preparation of the aromatic polycarbonates and/or aromatic polyester carbonates are preferably those of the formula (I)

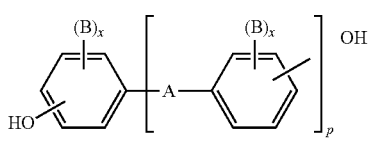

wherein

A is a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, $C_6$ to $C_{12}$-arylene, on to which further aromatic rings optionally containing hetero atoms can be fused, or a radical of the formula (II) or (III)

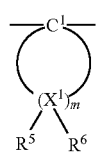

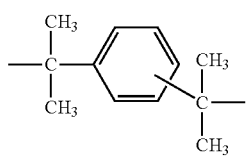

B is in each case $C_1$ to $C_{12}$-alkyl, preferably methyl, or halogen, preferably chlorine and/or bromine, x is in each case independently of one another 0, 1 or 2, p is 1 or 0, and $R^5$ and $R^6$ can be chosen individually for each $X^1$ and independently of one another denote hydrogen or $C_1$ to $C_6$-alkyl, preferably hydrogen, methyl or ethyl, $X^1$ denotes carbon and m denotes an integer from 4 to 7, preferably 4 or 5, with the proviso that on at least one atom $X^1$ $R^5$ and $R^6$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl)sulfoxides, bis-(hydroxyphenyl) ketones, bis-(hydroxyphenyl)sulfones and α,α-bis-(hydroxyphenyl)-diisopropyl-benzenes and derivatives thereof brominated on the nucleus and/or chlorinated on the nucleus.

Particularly preferred diphenols are 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxy-phenyl)-3,3,5-trimethylcyclohexane, 4,4'-dihydroxydiphenyl sulfide, 4,4'-dihydroxydiphenyl sulfone and di- and tetrabrominated or chlorinated derivatives thereof, such as, for example, 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-Bis-(4-hydroxyphenyl)-propane (bisphenol A) is particularly preferred.

The diphenols can be employed individually or as any desired mixtures. The diphenols are known from the literature and/or obtainable by processes known from the literature.

Chain terminators which are suitable for the preparation of the thermoplastic aromatic polycarbonates are, for example, phenol, p-chlorophenol, p-tert-butylphenol or 2,4,6-tribromophenol, but also long-chain alkylphenols, such as 4-[2-(2,4,4-trimethylpentyl)]-phenol, 4-(1,3-tetramethylbutyl)-phenol according to DE-A 2 842 005 or monoalkylphenols or dialkylphenols having a total of 8 to 20 carbon atoms in the alkyl substituents, such as 3,5-di-tert-butylphenol, p-iso-octylphenol, p-tert-octylphenol, p-dodecylphenol and 2-(3,5-dimethyl-heptyl)-phenol and 4-(3,5-dimethylheptyl)-phenol. The amount of chain terminators to be employed is in general between 0.5 mol % and 10 mol %, based on the sum of the moles of the particular diphenols employed.

The thermoplastic aromatic polycarbonates generally have average weight-average molecular weights ($M_w$, measured e.g. by GPC, ultracentrifuge or scattered light measurement) of from 10,000 to 200,000 g/mol, preferably 15,000 to 80,000 g/mol, particularly preferably 24,000 to 32,000 g/mol.

The thermoplastic aromatic polycarbonates can be branched in a known manner, and in particular preferably by incorporation of from 0.05 to 2.0 mol %, based on the sum of the diphenols employed, of compounds which are trifunctional or more than trifunctional, for example those having three and more phenolic groups.

Both homopolycarbonates and copolycarbonates are suitable. 1 to 25 wt. %, preferably 2.5 to 25 wt. %, based on the total amount of diphenols to be employed, of polydiorganosiloxanes having hydroxyaryloxy end groups can also be employed for the preparation of the copolycarbonates according to the disclosure according to component A. These are known (U.S. Pat. No. 3,419,634) and can be prepared by processes known from the literature. The preparation of copolycarbonates containing polydiorganosiloxane is described, for example, in DE-A 3 334 782.

Preferred polycarbonates are, in addition to bisphenol A homopolycarbonates, copolycarbonates of bisphenol A with up to 15 mol %, based on the sum of the moles of diphenols, of other diphenols mentioned as preferred or particularly preferred, in particular 2,2-bis(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and of naphthalene-2,6-dicarboxylic acid. Mixtures of the diacid dichlorides of isophthalic acid and of terephthalic acid in a ratio of between 1:20 and 20:1 are particularly preferred.

A carbonic acid halide, preferably phosgene, is additionally co-used as a bifunctional acid derivative in the preparation of polyester carbonates.

Possible chain terminators for the preparation of the aromatic polyester carbonates are, in addition to the monophenols already mentioned, also chlorocarbonic acid esters thereof and the acid chlorides of aromatic monocarboxylic acids, which can optionally be substituted by $C_1$ to $C_{22}$-alkyl groups or by halogen atoms, and aliphatic $C_2$ to $C_{22}$-monocarboxylic acid chlorides.

The amount of chain terminators is advantageously in each case 0.1 to 10 mol %, based on the moles of diphenol in the case of the phenolic chain terminators and on the moles of dicarboxylic acid dichloride in the case of monocarboxylic acid chloride chain terminators.

The aromatic polyesters carbonates can also contain incorporated aromatic hydroxycarboxylic acids.

The aromatic polyester carbonates can be either linear or branched in a known manner (in this context see DE-A 2 940 024 and DE-A 3 007 934).

Branching agents which can be used are, for example, carboxylic acid chlorides which are trifunctional or more than trifunctional, such as trimesic acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol-% (based on the dicarboxylic acid dichlorides employed), or phenols which are trifunctional or more than trifunctional, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis-(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-5'-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane or 1,4-bis-[4',4"-dihydroxytriphenyl)-methyl]-benzene, in amounts of from 0.01 to 1.0 mol %, based on the diphenols employed. Phenolic branching agents can be initially introduced with the diphenols, and acid chloride branching agents can be introduced together with the acid dichlorides.

The content of carbonate structural units in the thermoplastic aromatic polyester carbonates can vary as desired. The content of carbonate groups is preferably up to 100 mol %, in particular up to 80 mol %, particularly preferably up to 50 mol %, based on the sum of ester groups and carbonate groups. Both the ester and the carbonate content of the aromatic polyester carbonates can be present in the polycondensate in the form of blocks or in random distribution.

The relative solution viscosity ($\eta_{rel}$) of the aromatic polycarbonates and polyester carbonates is in the range of 1.18 to 1.4, preferably 1.20 to 1.32 (measured on solutions of 0.5 g of polycarbonate or polyester carbonate in 100 ml of methylene chloride solution at 25° C.).

The thermoplastic aromatic polycarbonates and polyester carbonates can be employed by themselves or in any desired mixture.

Component B

Component B preferably contains
Ba) at least one graft polymer prepared in emulsion polymerization and
Bb) at least one carboxylate salt, preferably a salt of a carboxylic acid having 10 to 30 carbon atoms, of a resin acid or of a resin acid derivative, particularly preferably a salt of a resin acid or of a resin acid derivative,
and has, suspended as a 10 wt. % strength suspension in distilled water, a pH of >7, preferably of from 7.5 to 10, in particular from 7.5 to 9.

Component B preferably contains
Ba) 99.95 to 95 parts by wt., preferably from 99.7 to 96 parts by wt., particularly preferably 99.5 to 97 parts by wt., based on the sum of components Ba) and Bb), of one or more graft polymers of
Ba.1 10 to 90 wt. %, preferably 20 to 70 wt. %, in particular 25 to 50 wt. %, based on the sum of components Ba.1 and Ba.2, of at least one vinyl monomer on
Ba.2 10 to 90 wt. %, preferably 30 to 80 wt. %, in particular 50 to 75 wt. %, based on the sum of components Ba.1 and Ba.2, of one or more graft bases having glass transition temperatures of <10° C., preferably <0° C., particularly preferably <−20° C., and
Bb) 0.05 to 5 parts by wt., preferably from 0.3 to 4 parts by wt., particularly preferably 0.5 to 3 parts by wt., based on the sum of components Ba) and Bb), of carboxylate salt, preferably a salt of a carboxylic acid having 10 to 30 carbon atoms, of a resin acid or of a resin acid derivative, particularly preferably a salt of a resin acid or of a resin acid derivative.

The graft base Ba.2 in general has an average particle size ($d_{50}$ value) of from 0.05 to 2 μm, preferably 0.1 to 1 μm, particularly preferably 0.2 to 0.5 μm.

Monomers B.1 are preferably mixtures of
Ba.1.1 50 to 99 parts by wt. of vinylaromatics and/or vinylaromatics substituted on the nucleus (such as styrene, α-methylstyrene, p-methylstyrene and p-chlorostyrene) and/or methacrylic acid ($C_1$-$C_8$)-alkyl esters, such as methyl methacrylate and ethyl methacrylate, and
Ba.1.2 1 to 50 parts by wt. of vinyl cyanides (unsaturated nitriles, such as acrylonitrile and methacrylonitrile) and/or (meth)acrylic acid ($C_1$-$C_8$)-alkyl esters, such as methyl methacrylate, n-butyl acrylate and t-butyl acrylate, and/or derivatives (such as anhydrides and imides) of unsaturated carboxylic acids, for example maleic anhydride and N-phenyl-maleimide.

Preferred monomers Ba.1.1 are preferably chosen from at least one of the monomers styrene, α-methylstyrene and methyl methacrylate, and preferred monomers Ba.1.2 are chosen from at least one of the monomers acrylonitrile, maleic anhydride and methyl methacrylate. Particularly preferred monomers are Ba.1.1 styrene and Ba.1.2 acrylonitrile.

Graft bases Ba.2 which are suitable for the graft polymers Ba) are, for example, diene rubbers, EP(D)M rubbers, that is to say those based on ethylene/propylene and optionally diene, and acrylate, polyurethane, silicone, chloroprene and ethylene/vinyl acetate rubbers and silicone/acrylate composite rubbers.

Preferred graft bases Ba.2 are diene rubbers, for example based on butadiene and isoprene, or mixtures of diene rubbers or copolymers of diene rubbers or mixtures thereof with further copolymerizable monomers (e.g. according to Ba.1.1 and Ba.1.2), with the proviso that the glass transition temperature of component Ba.2 is preferably below <10° C., more preferably <0° C., particularly preferably <−20° C. Pure polybutadiene rubber is particularly preferred.

Particularly preferred polymers Ba) are, for example, ABS and MBS polymers.

Suitable acrylate rubbers according to Ba.2 are preferably polymers of acrylic acid alkyl esters, optionally with up to 40 wt. %, based on Ba.2, of other polymerizable ethylenically unsaturated monomers. The preferred polymerizable acrylic acid esters include $C_1$ to $C_8$-alkyl esters, for example methyl, ethyl, butyl, n-octyl and 2-ethylhexyl esters, haloalkyl esters, preferably halo-$C_1$-$C_8$-alkyl esters, such as chloroethyl acrylate, and mixtures of these monomers.

For crosslinking, monomers having more than one polymerizable double bond can be copolymerized. Preferred examples of crosslinking monomers are esters of unsaturated monocarboxylic acids having 3 to 8 C atoms and unsaturated monohydric alcohols having 3 to 12 C atoms, or of saturated polyols having 2 to 4 OH groups and 2 to 20 C atoms, such as ethylene glycol dimethacrylate and allyl methacrylate; polyunsaturated heterocyclic compounds, such as trivinyl and triallyl cyanurate; polyfunctional vinyl compounds, such as di- and trivinylbenzenes; but also triallyl phosphate and diallyl phthalate. Preferred crosslinking monomers are allyl methacrylate, ethylene glycol dimethacrylate, diallyl phthalate and heterocyclic compounds which contain at least three ethylenically unsaturated groups. Particularly preferred crosslinking monomers are the cyclic monomers triallyl cyanurate, triallyl isocyanurate, triacryloylhexahydro-s-triazine and triallylbenzenes. The amount of the crosslinking monomers is preferably 0.02 to 5, in particular 0.05 to 2 wt. %, based on the graft base Ba.2. In the case of cyclic crosslinking monomers having at least three ethylenically unsaturated groups, it is advantageous to limit the amount to less than 1 wt. % of the graft base Ba.2.

Preferred "other" polymerizable ethylenically unsaturated monomers which can optionally serve for preparation of the graft base Ba.2 in addition to the acrylic acid esters are e.g. acrylonitrile, styrene, α-methylstyrene, acrylamides, vinyl $C_1$-$C_6$-alkyl ethers, methyl methacrylate and butadiene. Preferred acrylate rubbers as the graft base Ba.2 are emulsion polymers which have a gel content of at least 60 wt. %.

Further suitable graft bases according to Ba.2 are silicone rubbers having grafting-active sites, such as are described in DE-OS 3 704 657, DE-OS 3 704 655, DE-OS 3 631 540 and DE-OS 3 631 539.

The particulate graft base is preferably partly or completely crosslinked. The content of crosslinked graft base is characterized by the gel content in a suitable solvent.

The gel content of the graft base Ba.2 is determined at 25° C. in a suitable solvent as the content insoluble in these solvents (M. Hoffmann, H. Krömer, R. Kuhn, Polymeranalytik I und II, Georg Thieme-Verlag, Stuttgart 1977).

The gel content of the graft base Ba.2 is advantageously at least 30 wt. %, preferably at least 40 wt. %, particularly preferably at least 70 wt. % (measured in toluene).

The particle size of the graft base particles can be adjusted by direct growth or by agglomeration of a rubber latex with a smaller average particle size.

The average particle size $d_{50}$ is the diameter above and below which in each case 50 wt. % of the particles lie. It can be determined by means of ultracentrifuge measurement (W. Scholtan, H. Lange, Kolloid, Z. und Z. Polymere 250 (1972), 782-1796).

Graft polymers Ba) with a core-shell structure are preferred.

Component B can be prepared, for example, a) by physically mixing a graft polymer Ba) prepared in emulsion polymerization with carboxylate salt Bb), or b) by preparing a graft polymer Ba) in emulsion polymerization, a carboxylate salt Bb) being employed as an emulsifier in at least one process step of the preparation of the graft polymer and remaining in the graft polymer due to the preparation or being only partly removed from the graft polymer.

In a preferred embodiment, component B is a graft polymer prepared in emulsion polymerization, in the preparation of which a carboxylate salt is employed as an emulsifier. According to this embodiment, component B is obtainable by a process (i) wherein in a first process step a graft base Ba.2 is prepared, (ii) this is reacted in a second process step in emulsion polymerization with at least one vinyl monomer Ba.1 in a grafting reaction, wherein the grafting reaction is carried out at a pH of >7, preferably >8, in particular in a pH range of from 8 to 13, and wherein additives, such as, for example, stabilizers and antioxidants, are optionally added, preferably as an aqueous emulsion or dispersion, (iii) wherein in at least one of process steps (i) to (ii) a carboxylate salt Bb) is employed as an emulsifier, optionally in combination with further surface-active substances which differ from carboxylate salts Bb), (iv) wherein the precipitation of the graft polymer latex is carried out either in a basic medium, i.e. at a pH of >7, or under those conditions, optionally also slightly acidic conditions, which do not lead to complete neutralization of basic components already present, and (v) wherein the carboxylate salt employed as an emulsifier remains in the graft polymer during subsequent working up of the graft polymer latex or, however, is only partly removed from the graft polymer.

The carboxylate salt Bb) according to (iv) can be employed in the preparation of component B in an advantageous embodiment in the preparation of the graft base Ba.2 (i.e. in step (i)), in the grafting reaction (i.e. in step (ii)), in any addition of additives in the form of aqueous emulsions or dispersions (i.e. in step (iii)) or, however, in each case partly in the preparation of the graft base, the grafting reaction or in the addition of additives in the form of aqueous emulsions or dispersions. In this context, the carboxylate salt Bb) is preferably employed in reaction steps (i) to (iii) in total in a concentration of from 0.1 to 5 parts by wt., particularly preferably from 0.3 to 4 parts by wt., in particular from 0.5 to 3 parts by wt., in each case based on the weight of the component B to be prepared.

During the grafting reaction, as is known the grafting monomers are not necessarily grafted completely on to the graft base. Graft polymer according to component Ba is thus understood as meaning a product which is formed according to the process described above, and thus also can contain free, that is to say not bonded chemically to the rubber, (co)polymer formed by (co)polymerization of the grafting monomers in the presence of the graft base.

Carboxylate salts Bb), individually or in combination with one another, are preferably used as emulsifiers, for example and preferably metal salts of carboxylic acids having 10 to 30 carbon atoms (for example fatty acids having 10 to 30 carbon atoms), or resin acids or resin acid derivatives. The metal salts are preferably the alkali metal salts and alkaline earth metal salts, in particular the sodium and potassium salts (Na and K salts). The alkali metal salts, in particular the Na and K salts, of resin acids or of resin acid derivatives are particularly preferably employed as emulsifiers. Some, but not exhaustive, examples of such resin soaps are e.g. sodium or potassium salts of disproportionated dehydroabietic acid, which are marketed inter alia as Resin® 731D, Resin® 835A by Abieta GmbH (Gersthofen) and Gresinox® 578M by Granel S.A. (France).

The carboxylate salts Bb) can also be employed in combination with further surface-active substances, for example in combination with organic sulfates, sulfonates or phosphates, but also in combination with neutral emulsifiers in the synthesis of the graft base Ba.2 and/or in the grafting reaction and/or in any addition of additives.

The reaction procedure in the preparation of component B with the aid of the carboxylate-containing emulsifiers (i.e. carboxylate salts Bb) requires a basic medium at pH values of >7. The reaction is preferably carried out at a pH in the range of from 8 to 13. Maintaining of the basic level is as a rule ensured by employing alkalis, e.g. NaOH, KOH, amines or buffer systems, such as e.g. $NH_3/NH_4Cl$ or $NaHCO_3/Na_2CO_3$.

The graft copolymers Ba) are prepared by free-radical polymerization.

All agents which form free radicals and which dissociate at the chosen reaction temperature, which is between 30-95° C., preferably between 60-85° C. (that is to say both those which dissociate solely thermally and those which do so in the presence of a redox system), are typically suitable for starting the polymerization reaction. Possible polymerization initiators are preferably agents which form free radicals, for example peroxides, such as, preferably, peroxosulfates (for example sodium or potassium persulfate) and azo compounds, such as azodiisobutyronitrile. However, redox systems, in particular those based on hydroperoxides, such as tert-butyl hydroperoxide and cumene hydroperoxide, can also be employed.

Particularly suitable graft rubbers are those polymers which are prepared by redox initiation with an initiator system of organic hydroperoxide and ascorbic acid in accordance with U.S. Pat. No. 4,937,285.

The working up of the graft polymer dispersion in which the polymerization has finished plays an essential role in the preparation of component B, this being carried out either in a basic medium or in the latex of component B at least with incomplete neutralization of the basic constituents.

Examples of suitable working up processes are e.g. precipitation of the graft polymer dispersion by the action of aqueous electrolyte solutions, such as e.g. solutions of salts (e.g. magnesium sulfate, calcium chloride and sodium chloride), solutions of acids (e.g. sulfuric acid, hydrochloric acid, phosphoric acid and acetic acid) or mixtures thereof, precipitation by the action of low temperatures (freeze-coagulation) or obtaining of the precipitated product directly from the dispersion (the latex) by spray drying. In a preferred embodiment, the precipitation of the graft polymer dispersion is carried out by addition of a neutral salt (e.g. magnesium sulfate, calcium chloride and sodium chloride).

In this context, for the working up of component B of the compositions according to the disclosure it is essential that complete neutralization of the basic components does not take place, so that the dry component B obtained has a pH of >7, preferably 7.5 to 10, in particular 7.5 to 9, when this is suspended in distilled water (as a 10 wt. % strength suspension).

In an alternative working up process, after the precipitation the moist graft polymer (component B) is blended with a thermoplastic resin melt (component D) in a kneading reactor. Details of this working up process are described in EP-A 867 463. The compositions of graft polymer and thermoplastic resin according to component D which are obtained by this working up process can be employed for the preparation of the moulding compositions according to the disclosure.

Component C

At least one Brønsted acid phosphorus compound, that is to say a compound having at least one P—OH functionality, is employed as component C.

In a preferred embodiment, this is a Brønsted acid phosphorus compound in which the phosphorus has the oxidation level +3 or +5.

Suitable such Brønsted acid phosphorus compounds are both inorganic compounds (such as, for example and preferably, ortho-phosphoric acid, meta-phosphoric acid, oligophosphoric acid and phosphorous acid), and organic phosphorus compounds which have at least one P—OH functionality. These organic phosphorus compounds are half-esters or partial esters of ortho-phosphoric acid, meta-phosphoric oligophosphoric acid or of phosphorous acid with alcohols of any type, the half-esters or partial esters having at least one P—OH functionality. For example, component C is compounds chosen from at least one of the group consisting of $P(O)(OH)_3$, $P(O)(OH)(OR^7)(OR^8)$, $P(O)(OH)R^7(OR^8)$, $P(O)(OH)R^7R^8$, $P(O)(OH)_2(OR^7)$, $P(O)(OH)_2R^7$, $P(OH)_3$, $P(OH)(OR^7)(OR^8)$, $P(OH)(OR^7)R^8$, $P(OH)R^7R^8$, $P(OH)_2(OR^7)$, $P(OH)_2R^7$ and condensation products of the same species or different species of these abovementioned compounds, wherein $R^7$ and $R^8$ represent any desired identical or different organic radicals, for example an optionally substituted alkyl, aryl or alkylaryl radical. In this context, the radicals $R^7$ and $R^8$ can also be bonded to form a cyclic radical.

In a particularly preferred embodiment of the present disclosure, compounds according to formula (IV) are employed as component C

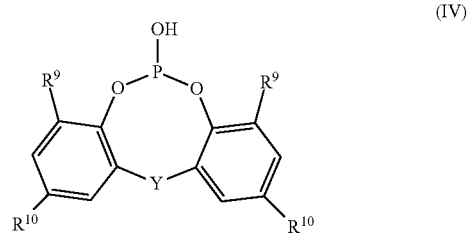

(IV)

wherein $R^9$ and $R^{10}$ independently of one another denote $C_1$ to $C_9$-alkyl, optionally substituted $C_5$ to $C_6$-cycloalkyl, $C_6$ to $C_{10}$-aryl or $C_7$ to $C_{12}$-aralkyl, and Y denotes S or $CZ^1Z^2$, wherein $Z^1$ and $Z^2$ independently of one another represent H, $C_1$ to $C_6$-alkyl, cyclohexenyl or cyclohexyl.

Compounds according to formula (IV) are known and are disclosed, for example, in EP-A 0 023 291.

Compounds which are most preferred as component C are phosphorous acid esters of bis-(2-hydroxy-3-cyclohexyl-5-methyl-phenyl)sulfide (formula IVa)

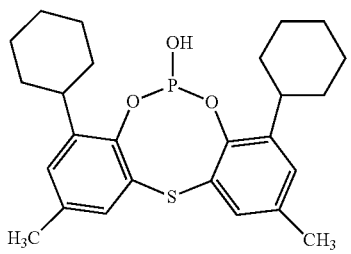
(IVa)

phosphorous acid esters of bis-(2-hydroxy-3-cyclohexyl-5-methyl-phenyl)-methane (formula IVb)

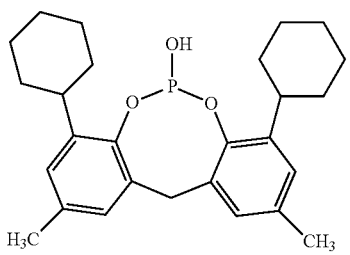
(IVb)

phosphorous acid esters of bis-(2-hydroxy-3-benzyl-5-methyl-phenyl)sulfide (formula IVc)

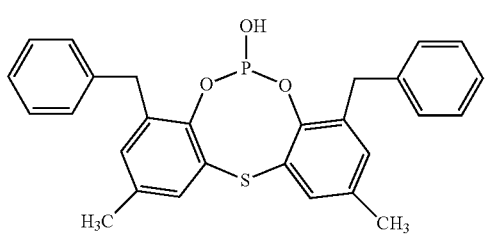
(IVc)

and phosphorous acid esters of bis-(2-hydroxy-3-benzyl-5-methyl-phenyl)-methane (formula IVd)

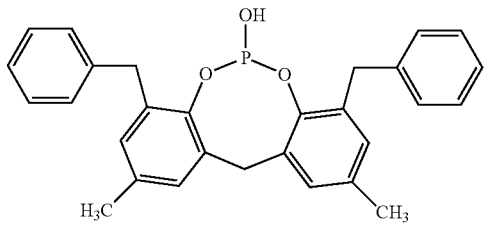
(IVd)

In a further preferred embodiment of the present disclosure, component C is compounds of the structures (V) or (VI)

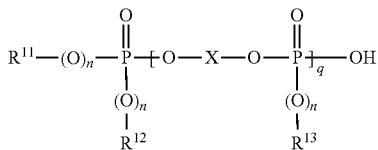
(V)

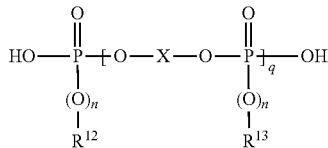
(VI)

wherein $R^{11}$, $R^{12}$ and $R^{13}$ independently of one another denote in each case optionally halogenated $C_1$ to $C_8$-alkyl, or $C_5$ to $C_6$-cycloalkyl, $C_6$ to $C_{20}$-aryl or $C_7$ to $C_{12}$-aralkyl in each case optionally substituted by alkyl, preferably $C_1$ to $C_4$-alkyl, and/or halogen, preferably chlorine or bromine, n independently of one another denotes 0 or 1, q denotes 0 to 30 and X denotes a mono- or polynuclear aromatic radical having 6 to 30 C atoms, or a linear or branched aliphatic radical having 2 to 30 C atoms, which can be substituted by OH and can contain up to 8 ether bonds.

Preferably, $R^{11}$, $R^{12}$ and $R^{13}$ independently of one another represent $C_1$ to $C_4$-alkyl, phenyl, naphthyl or phenyl-$C_1$-$C_4$-alkyl. The aromatic groups $R^{11}$, $R^{12}$ and $R^{13}$ can in their turn be substituted by halogen groups and/or alkyl groups, preferably chorine, bromine and/or $C_1$ to $C_4$-alkyl. Particularly preferred aryl radicals are cresyl, phenyl, xylenyl, propylphenyl or butylphenyl and the corresponding brominated and chlorinated derivatives thereof.

X in the formula (V) or (VI) preferably denotes a mono- or polynuclear aromatic radical having 6 to 30 C atoms. This is preferably derived from diphenols of the formula (I).

n in the formula (V) or (VI) can be, independently of one another, 0 or 1, and preferably n is 1.

q represents values from 0 to 30, preferably 0.3 to 20, particularly preferably 0.5 to 10, in particular 0.5 to 6, very particularly preferably 1.1 to 1.6.

X in the formula (V) or (VI) particularly preferably represents

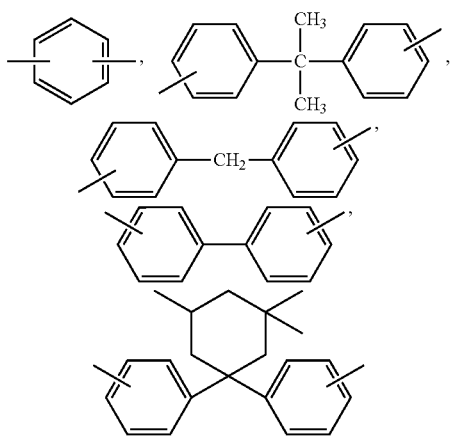

or chlorinated or brominated derivatives thereof, and in particular X is derived from resorcinol, hydroquinone, bisphenol A or diphenylphenol. Most preferably, X is derived from bisphenol A.

A compound which is most preferred in some embodiments as component C is that according to formula (Va)

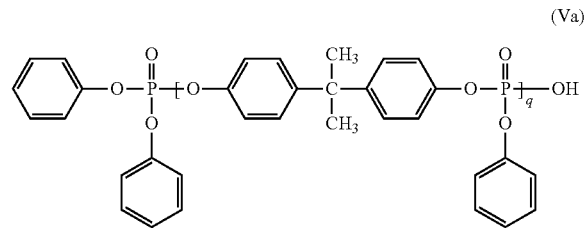

wherein q in formula (Va) represents values from 0 to 30, preferably 0.3 to 20, particularly preferably 0.5 to 10, in particular 0.5 to 6, very particularly preferably 1.1 to 1.6.

Mixtures of various phosphoric acid compounds can also be employed as component C according to the disclosure.

Component D

Polymers chosen from at least one representative of the group of graft polymers D.1 prepared in bulk, solution or suspension polymerization, of rubber-free (co)polymers D.2 and of polyesters D.3 are possible as component D.

Component D.1 includes graft polymers, prepared in bulk, solution or suspension polymerization, of D.1.1 50 to 95, preferably 70 to 92, in particular 75 to 90 wt. %, based on component D.1, of at least one vinyl monomer on D.1.2 5 to 50, preferably 8 to 30, in particular 10 to 25 wt. %, based component D.1, of one or more graft bases having glass transition temperatures of <10° C., preferably <0° C., particularly preferably <−20° C.

The graft base D.1.2 in general has an average particle size ($d_{50}$ value) of from 0.1 to 10 µm, preferably 0.3 to 5 µm, particularly preferably 0.5 to 2.0 µm.

Monomers D.1.1 are preferably mixtures of

D.1.1.1 50 to 99 parts by wt. of vinylaromatics and/or vinylaromatics substituted on the nucleus (such as styrene, α-methylstyrene, p-methylstyrene and p-chlorostyrene) and/or methacrylic acid ($C_1$-$C_8$)-alkyl esters (such as methyl methacrylate and ethyl methacrylate) and D.1.1.2 1 to 50 parts by wt. of vinyl cyanides (unsaturated nitriles, such as acrylonitrile and methacrylonitrile) and/ or (meth)acrylic acid ($C_1$-$C_8$)-alkyl esters, such as methyl methacrylate, n-butyl acrylate and t-butyl acrylate, and/or derivatives (such as anhydrides and imides) of unsaturated carboxylic acids, for example maleic anhydride and N-phenyl-maleimide.

Preferred monomers D.1.1.1 are chosen from at least one of the monomers styrene, α-methylstyrene and methyl methacrylate, and preferred monomers D.1.1.2 are chosen from at least one of the monomers acrylonitrile, maleic anhydride and methyl methacrylate. Particularly preferred monomers are D.1.1.1 styrene and D.1.1.2 acrylonitrile.

Graft bases D.1.2 which are suitable for the graft polymers D.1 are, for example, diene rubbers, EP(D)M rubbers, that is to say those based on ethylene/propylene and optionally diene, and acrylate, polyurethane, silicone, chloroprene and ethylene/vinyl acetate rubbers and silicone/acrylate composite rubbers.

Preferred graft bases D.1.2 are diene rubbers, for example based on butadiene, isoprene, or mixtures of diene rubbers or copolymers of diene rubbers or mixtures thereof with further copolymerizable monomers (e.g. according to D.1.1.1 and D.1.1.2), with the proviso that the glass transition temperature of component D.1.2 is advantageously below <10° C., preferably <0° C., particularly preferably <−20° C. Pure polybutadiene rubber is particularly preferred.

Particularly preferred polymers D.1 are, for example, ABS polymers.

The graft copolymers D.1 are prepared by free-radical polymerization.

The gel content of the graft polymers D.1 is preferably 10 to 50 wt. %, in particular 15 to 40 wt. % (measured in acetone).

Since as is known the grafting monomers are not necessarily grafted completely on to the graft base during the grafting reaction, according to the disclosure, graft polymers D.1 are also understood as meaning those products which are produced by (co)polymerization of the grafting monomers in the presence of the graft base and are also obtained during the working up. These products can accordingly also contain free, i.e. not bonded chemically to the rubber, (co)polymer of the grafting monomers.

The weight-average molecular weight $M_w$ of the free, i.e. not bonded chemically to the rubber, (co)polymer in the graft polymer D.1 is preferably 50,000 to 250,000 g/mol, in particular 60,000 to 200,000 g/mol, particularly preferably 70,000 to 130,000 g/mol.

The rubber-free vinyl (co)polymers D.2 are rubber-free homo- and/or copolymers of at least one monomer from the group of vinylaromatics, vinyl cyanides (unsaturated nitriles), (meth)acrylic acid ($C_1$ to $C_8$)-alkyl esters, unsaturated carboxylic acids and derivatives (such as anhydrides and imides) of unsaturated carboxylic acids.

(Co)polymers D.2 which are suitable in particular are those of

D.2.1 50 to 99 wt. %, based on the (co)polymer D.2, of at least one monomer chosen from the group of vinylaromatics (such as, for example, styrene and α-methylstyrene), vinylaromatics substituted on the nucleus (such as, for example, p-methylstyrene and p-chlorostyrene) and (meth)acrylic acid ($C_1$-$C_8$)-alkyl esters (such as, for example, methyl methacrylate, n-butyl acrylate and tert-butyl acrylate) and D.2.2 1 to 50 wt. %, based on the (co)polymer D.2, of at least one monomer chosen from the group of vinyl cyanides (such as, for example, unsaturated nitriles, such as acrylonitrile and methacrylonitrile), (meth)acrylic acid ($C_1$-$C_8$)-alkyl esters (such as, for example, methyl methacrylate, n-butyl acrylate and tert-butyl acrylate), unsaturated carboxylic acids and derivatives of unsaturated carboxylic acids (for example maleic anhydride and N-phenyl-maleimide).

These (co)polymers D.2 are resinous, thermoplastic and rubber-free. The copolymer of styrene and acrylonitrile is particularly preferred.

Such (co)polymers D.2 are known and can be prepared by free-radical polymerization, in particular by emulsion, suspension, solution or bulk polymerization. The (co)polymers preferably have average molecular weights $M_w$ (weight-average, determined by GPC, light scattering or sedimentation) of between 50,000 and 250,000, in particular 60,000 to 180, 000 g/mol, particularly preferably 70,000 to 150,000 g/mol.

The polyalkylene terephthalates of component D.3 are reaction products of aromatic dicarboxylic acids or their reactive derivatives, such as dimethyl esters or anhydrides, and aliphatic, cycloaliphatic or araliphatic diols, and mixtures of these reaction products.

Preferred polyalkylene terephthalates contain at least 80 wt. %, preferably at least 90 wt. %, based on the dicarboxylic acid component, of terephthalic acid radicals and at least 80 wt. %, preferably at least 90 mol %, based on the diol component, of radicals of ethylene glycol and/or butane-1,4-diol.

The preferred polyalkylene terephthalates can contain, in addition to terephthalic acid radicals, up to 20 mol %, preferably up to 10 mol % of radicals of other aromatic or cycloaliphatic dicarboxylic acids having 8 to 14 C atoms or aliphatic dicarboxylic acids having 4 to 12 C atoms, such as e.g. radicals of phthalic acid, isophthalic acid, naphthalene-2,6-dicarboxylic acid, 4,4'-diphenyldicarboxylic acid, succinic acid, adipic acid, sebacic acid, azelaic acid and cyclohexanediacetic acid.

The preferred polyalkylene terephthalates can contain, in addition to radicals of ethylene glycol or butane-1,4-diol, up to 20 mol %, preferably up to 10 mol % of other aliphatic diols having 3 to 12 C atoms or cycloaliphatic diols having 6 to 21 C atoms, e.g. radicals of propane-1,3-diol, 2-ethylpropane-1, 3-diol, neopentyl glycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3-diol, 2-ethylhexane-1,3-diol, 2,2-diethylpropane-1,3-diol, hexane-2,5-diol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(4-β-hydroxyethoxyphenyl)-propane and 2,2-bis-(4-hydroxypropoxyphenyl)-propane (DE-A 2 407 674, 2 407 776 and 2 715 932).

The polyalkylene terephthalates can be branched by incorporation of relatively small amounts of 3- or 4-hydric alcohols or 3- or 4-basic carboxylic acids, e.g. in accordance with DE-A 1 900 270 and U.S. Pat. No. 3,692,744. Examples of preferred branching agents are trimesic acid, trimellitic acid, trimethylolethane and -propane and pentaerythritol.

Polyalkylene terephthalates which have been prepared solely from terephthalic acid and reactive derivatives thereof (e.g. dialkyl esters thereof) and ethylene glycol and/or butane-1,4-diol, and mixtures of these polyalkylene terephthalates are particularly preferred.

Mixtures of polyalkylene terephthalates contain 1 to 50 wt. %, preferably 1 to 30 wt. % of polyethylene terephthalate and 50 to 99 wt. %, preferably 70 to 99 wt. % of polybutylene terephthalate.

The polyalkylene terephthalates preferably used in general have a limiting viscosity of from 0.4 to 1.5 dl/g, preferably 0.5 to 1.2 dl/g, measured in phenol/o-dichlorobenzene (1:1 parts by weight) at 25° C. in an Ubbelohde viscometer.

The polyalkylene terephthalates can be prepared by known methods (see e.g. Kunststoff-Handbuch, volume VIII, p. 695 et seq., Carl-Hanser-Verlag, Munich 1973).

Component E

The compositions according to the disclosure can comprise further additives as component E.

Possible further additives according to component E are commercially available polymer additives chosen from the group containing flameproofing agents (for example phosphorus compounds or halogen compounds), flameproofing synergists (for example nanoscale metal oxides), smoke-suppressing additives (for example boric acid or zinc borate), antidripping agents (for example compounds from the substance classes of fluorinated polyolefins, of silicones or aramid fibres), internal and external lubricants and mould release agents (for example pentaerythritol tetrastearate, montan wax or polyethylene wax), flowability auxiliary agents (for example low molecular weight vinyl (co)polymers), antistatics (for example block copolymers of ethylene oxide and propylene oxide, other polyethers or polyhydroxy ethers, polyether amides, polyester amides or sulfonic acid salts), conductivity additives (for example conductive carbon black or carbon nanotubes), stabilizers (for example UV/light stabilizers, heat stabilizers, antioxidants, transesterification inhibitors and agent which prevent hydrolysis), additives having an antibacterial action (for example silver or silver salts), additives which improve scratch resistance (for example silicone oils or ceramic (hollow) beads), IR absorbents, optical brighteners, fluorescent additives, impact modifiers which differ from component B, fillers and reinforcing substances in platelet, flake or fibre form (for example wollastonite, glass fibres or carbon fibres, mica, montmorillonite, clay layer minerals, phyllosilicates, kaolin, talk and glass flakes) and dyestuffs and pigments.

Phosphorus-containing compounds are preferably employed as flameproofing agent according to component E. These are preferably chosen from the groups of mono- and oligomeric phosphoric and phosphonic acid esters, phosphonatamines and phosphazenes, it also being possible to employ mixtures of several components chosen from one or various of these groups as the flameproofing agent. Other halogen-free phosphorus compounds not mentioned specifically here can also be employed by themselves or in any desired combination with other halogen-free phosphorus compounds.

Preferred mono- and oligomeric phosphoric or phosphonic acid esters are phosphorus compounds of the general formula (VII)

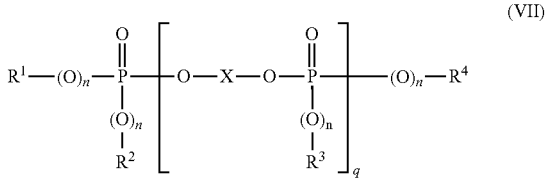

wherein $R^1, R^2, R^3$ and $R^4$ independently of one another denote in each case optionally halogenated $C_1$ to $C_8$-alkyl, or $C_5$ to $C_6$-cycloalkyl, $C_6$ to $C_{20}$-aryl or $C_7$ to $C_{12}$-aralkyl in each case optionally substituted by alkyl, preferably $C_1$ to $C_4$-alkyl, and/or halogen, preferably chlorine or bromine, n independently of one another denotes 0 or 1, q denotes 0 to 30 and X denotes a mono- or polynuclear aromatic radical having 6 to 30 C atoms, or a linear or branched aliphatic radical having 2 to 30 C atoms, which can be substituted by OH and can contain up to 8 ether bonds.

Preferably, $R^1, R^2, R^3$ and $R^4$ independently of one another represent $C_1$ to $C_4$-alkyl, phenyl, naphthyl or phenyl-$C_1$-$C_4$-alkyl. The aromatic groups $R^1, R^2, R^3$ and $R^4$ can in their turn be substituted by halogen groups and/or alkyl groups, preferably chorine, bromine and/or $C_1$ to $C_4$-alkyl. Particularly preferred aryl radicals are cresyl, phenyl, xylenyl, propylphenyl or butylphenyl and the corresponding brominated and chlorinated derivatives thereof X in the formula (VII) preferably denotes a mono- or polynuclear aromatic radical having 6 to 30 C atoms. This is preferably derived from diphenols of the formula (I).

n in the formula (VII) can be, independently of one another, 0 or 1, and preferably n is 1.

q represents values from 0 to 30, preferably 0.3 to 20, particularly preferably 0.5 to 10, in particular 0.5 to 6, very particularly preferably 1.1 to 1.6.

X particularly preferably represents

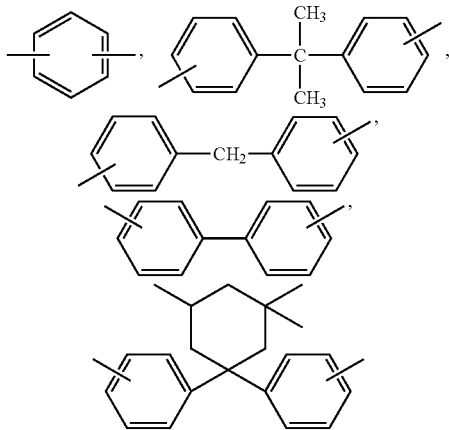

or chlorinated or brominated derivatives thereof, and in particular X is derived from resorcinol, hydroquinone, bisphenol A or diphenylphenol. Particularly preferably, X is derived from bisphenol A.

Mixtures of various phosphates can also be employed as component E according to the disclosure.

Phosphorus compounds of the formula (VII) are, in particular, tributyl phosphate, triphenyl phosphate, tricresyl phosphate, diphenyl cresyl phosphate, diphenyl octyl phosphate, diphenyl 2-ethylcresyl phosphate, tri-(isopropylphenyl)phosphate, resorcinol-bridged oligophosphate and bisphenol A-bridged oligophosphate. The use of oligomeric phosphoric acid esters of the formula (IV) which are derived from bisphenol A is particularly preferred.

Bisphenol A-based oligophosphate according to formula (VIIa)

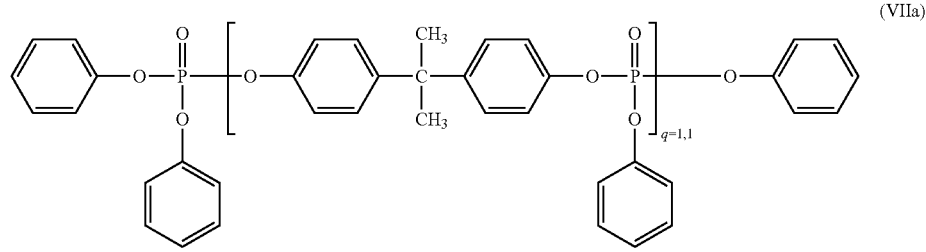

is most preferred as component E.

The phosphorus compounds according to component E are known (cf. e.g. EP-A 0 363 608, EP-A 0 640 655) or can be prepared by known methods in an analogous manner (e.g. Ullmanns Enzyklopädie der technischen Chemie, vol. 18, p. 301 et seq. 1979; Houben-Weyl, Methoden der organischen Chemie, vol. 12/1, p. 43; Beilstein vol. 6, p. 177).

If mixtures of various phosphorus compounds are employed, and in the case of oligomeric phosphorus compounds, the q value stated is the average q value. The average q value can be determined by determining the composition of the phosphorus compound (molecular weight distribution) by means of a suitable method (gas chromatography (GC), high pressure liquid chromatography (HPLC), gel permeation chromatography (GPC)) and calculating the mean values for q therefrom.

Phosphonatamines and phosphazenes such as are described in WO 00/00541 and WO 01/18105 can furthermore be employed as flameproofing agents.

The flameproofing agents can be employed by themselves or in any desired mixture with one another or in a mixture with other flameproofing agents.

In a preferred embodiment, the flameproofing agents are employed in combination with polytetrafluoroethylene (PTFE) as an antidripping agent.

Preparation of the Moulding Compositions

A moulding composition according to the disclosure can be prepared, for example, by mixing the particular constituents in a known manner and subjecting the mixture to melt compounding and melt extrusion at temperatures of from 200° C. to 360° C., preferably at 240 to 340° C., particularly preferably at 240° C. to 320° C. in conventional units, such as internal kneaders, extruders and twin-screw extruders. The mixing of the individual constituents can be carried out in a known manner either successively or simultaneously, and in particular either at about 20° C. (room temperature) or at a higher temperature.

The disclosure likewise provides processes for the preparation of the moulding compositions and the use of the moulding compositions for the production of shaped articles and the mouldings themselves.

The moulding compositions according to the disclosure can be used for the production of all types of shaped articles. These can be produced by injection moulding, extrusion and blow moulding processes. A further form of processing is the production of shaped articles by thermoforming from previously produced sheets or films. Examples of such shaped articles are films, profiles, housing components of all types, e.g. for domestic appliances, such as televisions, juice presses, coffee machines and mixers; for office machines, such as monitors, flat screens, notebooks, printers and copiers; sheets, tubes, electrical installation conduits, windows, doors and further profiles for the building sector (interior finishing and exterior uses) and electrical and electronic components, such as switches, plugs and sockets, and vehicle body or interior components for utility vehicles, in particular for the automobile sector.

The moulding compositions according to the disclosure can also be used in particular, for example, for the production of the following shaped articles or mouldings: interior finishing components for rail vehicles, ships, aircraft, buses and other motor vehicles, housing of electrical equipment containing small transformers, housing for equipment for processing and transmission of information, housing and lining of medical equipment, massage equipment and housing therefor, toy vehicles for children, planar wall elements, housing for safety equipment and for televisions, thermally insulated transportation containers, mouldings for sanitary and bath fittings, cover grids for ventilator openings and housing for garden equipment.

The following examples serve to explain the disclosure further.

EXAMPLES

Component A1

Linear polycarbonate based on bisphenol A having a weight-average molecular weight $\overline{M}_w$ of 28,000 g/mol (determined by GPC).

Component B-1

Component B.1 was prepared by a procedure in which
(i) a particulate graft base of polybutadiene rubber with an average particle size $d_{50}$ of 0.3 μm was prepared as the graft base Ba-1.2 from butadiene in emulsion polymerization (with 80% conversion, based on the butadiene employed),
(ii) 60 parts by wt. of this graft base were then reacted in a second process step in emulsion polymerization with 40 parts by wt. of a mixture of the monomers styrene and acrylonitrile (in a weight ratio of styrene to acrylonitrile of 72:28) in a grafting reaction, the grafting reaction being carried out in a pH range of from 8 to 13,
(iii) wherein in process step (i) 0.8 part by wt. (based on the butadiene employed) of the disodium salt of the emulsifier acid disclosed in EP-A 394 779, Example 1 (in this context see the simplified formula (VIII))

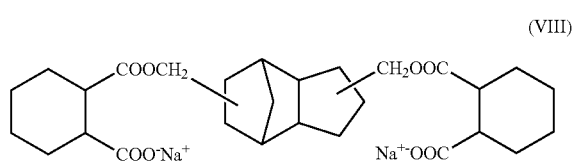

(VIII)

and in process step (ii) 2.2 parts by wt. (based on the sum of the acrylonitrile, styrene and polybutadiene rubber employed) of Resin® 731D from Abieta GmbH (Gersthofen) (sodium salt of disproportionated dehydroabietic acid) were added as an emulsifier,
(iv) precipitation of the graft polymer latex was then carried out in the basic medium, i.e. at a pH of >7, by addition of magnesium sulfate and the coagulate was filtered off and dried,
(v) the emulsifiers being only partly removed from the graft polymer during the working up of the graft polymer latex.

The resulting component B-1 comprised
B-1a) approx. 97.2 to 99.4 parts by wt., based on the sum of components B-1a) and B-1b), of a graft polymer, prepared in emulsion polymerisation, of
  B-1a.1 40 parts by wt. (based on the sum of B-1a.1 and B-1a.2) of styrene/acrylonitrile copolymer with a ratio of styrene to acrylonitrile of 72:28 wt. % as the shell on
  B-1a.2 60 parts by wt. (based on the sum of B-1a.1 and B-1a.2) a particulate graft base of polybutadiene rubber with an average particles size $d_{50}$ of 0.3 μm as the core, and
B-1b) approx. 0.6 to 2.8 parts by wt., based on the sum of components B-1a) and B-1b), of carboxylate salts (Na or Mg salts of the emulsifier acids employed in steps (i) and (ii)).

The pH of a dispersion of this resulting component B-1 in distilled water (10 wt. % of B-1 suspended in distilled water) was pH=8 to 9 (i.e. in the basic range).

Component B-2 (Comparison)

Graft polymer comparable to B-1, but precipitated in an acidic medium using a magnesium sulfate/acetic acid mixture. The pH of a dispersion of this graft polymer in distilled water (10 wt. % of B-2 suspended in distilled water) is pH 6 to 7 and therefore in the slightly acidic range.

Component C

Phosphorous acid ester of bis-(2-hydroxy-3-cyclohexyl-5-methyl-phenyl)-methane (formula (IVb)

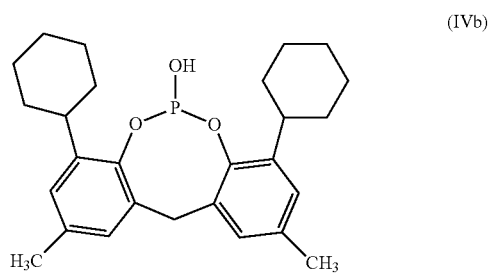

(IVb)

Component D

Styrene/acrylonitrile copolymer with a styrene/acrylonitrile weight ratio of 76:24 wt. % and an average molecular weight Mw of 100,000 g/mol (measurement by GPC in dimethylformamide at 20° C.).

Component E

E-1: Heat stabilizer, Irganox® 1076, Ciba Speciality Chemicals
E-2: Heat stabilizer, Irganox® B 900, Ciba Speciality Chemicals
E-3: Pentaerythritol tetrastearate as a lubricant/mould release agent
E-4: Carbon Black Pearls 800, Cabot Preparation and Testing of the Moulding Compositions The compositions listed in Tables 1-3 are compounded on a twin-screw extruder (ZSK-25) (Werner and Pfleiderer) or on a 1.3 l internal kneader at temperatures of from 220 to 270° C. and subsequently granulated. The finished granules are processed on an injection moulding machine (Arburg) at melt temperatures of 260° C. or 300° C. and a mould temperature of 80° C. to give test specimens of dimensions 80 mm×10 mm×4 mm.

The following methods are used for characterization of the properties of the test specimens:

The low temperature toughness is evaluated with the aid of the IZOD notched impact strength, measured in accordance with ISO 180-1A at −20° C. on test specimens which have been produced in injection moulding at a melt temperature of 260° C.

The resistance to stress cracking (ESC) in rape oil at room temperature serves as a measure of the resistance to chemicals of components injection-moulded under critical processing conditions. The time until stress cracking-induced fracture failure of a test specimen of dimensions 80 mm×10 mm×4 mm injection-moulded at a melt temperature of 300° C., which is loaded with an external edge fibre elongation of 2.4% by means of a clamping template and immersed completely in the medium, is determined. The measurement is carried out in accordance with ISO 4599.

The change in the MVR measured in accordance with ISO 1133 at 260° C. with a plunger load of 5 kg during storage of the granules at 95° C. and 100% relative atmospheric humidity for 7 days serves as a measure of the resistance of the compositions prepared to hydrolysis. In this context, the increase in the MVR value compared with the MVR value before the corresponding storage is calculated as ΔMVR(hydrolysis), which is defined by the following formula.

$$\Delta MVR(\text{hydrolysis}) = \frac{MVR(\text{after } FWL \text{ storage}) - MVR(\text{before storage})}{MVR(\text{before storage})} \cdot 100\%$$

The iMVR measured in accordance with ISO 1133 at 300° C. with a plunger load of 5 kg after a holding time at the measurement temperature of 15 minutes serves as a measure of the heat stability of the compositions prepared.

TABLE 1

Compositions and their properties

| | Composition [parts by wt.] | | | |
|---|---|---|---|---|
| | 1 (comp.) | 2 | 3 | 4 (comp.) |
| A (polycarbonate) | 43 | 43 | 43 | 43 |
| B-1 (graft - basic) | 24 | 24 | 24 | — |
| B-2 (graft - acidic) | — | — | — | 24 |
| C (phosphoric acid compound) | — | 0.15 | 0.15 | — |
| D (SAN) | 33 | 33 | 33 | 33 |
| E-1 (antioxidant) | 0.10 | 0.10 | 0.10 | 0.10 |
| E-2 (neutral phosphite stabilizer) | 0.15 | — | — | 0.15 |
| E-3 (PETS) | 0.75 | 0.75 | 0.75 | 0.75 |
| E-4 (carbon black) | — | — | 0.75 | 0.75 |
| Properties | | | | |
| delta MVR(hydrolysis) [ml/10 min] | 15 | 11 | 10 | 15 |
| iMVR (300° C./5 kg/15 min) [ml/10 min] | 130 | 51 | 40 | 47 |
| ak(−20° C.) [kJ/m²] | n.m. | n.m. | 25 | 22 |
| ESC (rape oil, 2.4%; time to fracture) [h] | n.m. | n.m. | 2.1 | 1.0 | n.m. = not measured

TABLE 2

Compositions and their properties

| | Composition [parts by wt.] | | |
|---|---|---|---|
| | 5 | 6 (comp.) | 7 (comp.) |
| A (polycarbonate) | 58 | 58 | 58 |
| B-1 (graft - basic) | 18 | — | — |
| B-2 (graft - acidic) | — | 18 | 18 |
| C (phosphoric acid compound) | 0.12 | — | 0.12 |
| D (SAN) | 24 | 24 | 24 |
| E-1 (antioxidant) | 0.10 | 0.10 | 0.10 |
| E-2 (neutral phosphite stabilizer) | — | 0.12 | — |
| E-3 (PETS) | 0.75 | 0.75 | 0.75 |
| E-4 (carbon black) | 0.75 | 0.75 | 0.75 |
| Properties | | | |
| delta MVR(hydrolysis) | 12 | 18 | 30 |
| iMVR (300° C./5 kg/15 min) | 52 | 64 | n.m. |
| ak(−20° C.) [kJ/m²] | 27 | 24 | n.m. |
| ESC (rape oil, 2.4%; time to fracture) [h] | 2.3 | 1.0 | n.m. | n.m. = not measured

TABLE 3

Compositions and their properties

| | Composition [parts by wt.] | | | |
|---|---|---|---|---|
| | 8 (comp.) | 9 | 10 | 11 (comp.) |
| A (polycarbonate) | 70 | 70 | 70 | 70 |
| B-1 (graft - basic) | 14 | 14 | 14 | — |
| B-2 (graft - acidic) | — | — | — | 14 |
| C (phosphoric acid compound) | — | 0.10 | 0.10 | — |
| D (SAN) | 16 | 16 | 16 | 16 |
| E-1 (antioxidant) | 0.10 | 0.10 | 0.10 | 0.10 |
| E-2 (neutral phosphite stabilizer) | 0.10 | — | — | 0.10 |
| E-3 (PETS) | 0.75 | 0.75 | 0.75 | 0.75 |
| E-4 (carbon black) | — | — | 0.75 | 0.75 |
| Properties | | | | |
| delta MVR(hydrolysis) | 5 | 14 | 13 | 17 |
| iMVR (300° C./5 kg/15 min) | 153 | 67 | 58 | 70 |
| ak(−20° C.) [kJ/m²] | n.m. | n.m. | 29 | 25 |
| ESC (rape oil, 2.4%; time to fracture) [h] | n.m. | n.m. | 2.0 | 1.5 | n.m. = not measured

The examples in Tables 1 to 3 show that those polycarbonate compositions which are impact-modified with graft polymers prepared in the emulsion process surprisingly have a combination of improved stability to hydrolysis and heat stability with a simultaneously good low temperature toughness and resistance to chemicals if the emulsion graft polymer—contrary to the teaching of the prior art (see, for example, EP 900 827 B1)—has been precipitated and worked up not in an acidic but rather in a basic medium, and therefore contains basic components, as long as the composition is stabilized with an acidic phosphorus compound (Examples 2, 3, 5, 9 and 10).

Compositions in which emulsion graft polymers which have been precipitated in an acidic medium are employed for modification of the impact strength and are stabilized with a neutral phosphite stabilizer show a poorer stability to hydrolysis and heat stability, resistance to chemicals and low temperature toughness (C4, C6 and C11) compared with comparable compositions according to the disclosure. If those compositions with emulsion graft polymers which have been precipitated in an acidic medium are additionally stabilized with acidic phosphorus compounds, a drastic further deterioration in the resistance to hydrolysis is observed (C7).

Compositions in which the emulsion graft polymer has been precipitated in an acidic medium and which are stabilized with a neutral phosphite stabilizer as expected show a lack of heat stability (C1 and C8) compared with comparable compositions according to the disclosure.

Additional advantages, features and modifications will readily occur to those skilled in the art. Therefore, the disclosure in its broader aspects is not limited to the specific details, and representative devices, shown and described herein. Accordingly, various modifications may be made without departing from the spirit or scope of the general concept as defined by the appended claims and their equivalents.

All documents referred to herein are specifically incorporated herein by reference in their entireties.

As used herein and in the following claims, articles such as "the", "a" and "an" can connote the singular or plural.

The invention claimed is:
1. A composition comprising
   A) aromatic polycarbonate or aromatic polyester carbonate and/or a mixture thereof,

B) a mixture comprising
  Ba) at least one graft polymer prepared in emulsion polymerization and
  Bb) at least one carboxylate salt,
wherein this mixture, suspended as a 10 wt. % strength suspension in distilled water, has a pH of >7,
C) at least one acidic phosphorus compound with at least one P—OH functionality.

2. A composition according to claim 1, comprising
A) 10 to 99.5 parts by wt., based on the sum of components A+B+D, of aromatic polycarbonate or aromatic polyester carbonate or mixtures of these,
B) 0.5 to 60 parts by wt., based on the sum of components A+B+D, of a mixture comprising
  Ba) at least one graft polymer prepared in emulsion polymerization and
  Bb) at least one carboxylate salt,
wherein this mixture, suspended as a 10 wt. % strength suspension in distilled water, has a pH of >7,
C) 0.001 to 1 part by wt., based on the sum of components A+B+D, of at least one acidic phosphorus compound with at least one P—OH functionality,
D) 0 to 60 parts by wt., based on the sum of components A+B+D, of a polymer chosen from the group of vinyl (co)polymers, polyesters and/or rubber-modified vinyl (co)polymers which differ from component B,
E) 0 to 40 parts by wt., based on the sum of components A+B+D, of at least one polymer additive,
wherein components B and C are employed in a ratio of 30:1 to 2,000:1.

3. A composition according to claim 2, comprising
D) 0.5 to 40 parts by wt., based on the sum of components A+B+D, of a polymer chosen from the group of vinyl (co)polymers, polyesters and/or rubber-modified vinyl (co)polymers which differ from component B,
E) 0.1 to 30 parts by wt., based on the sum of components A+B+D, of at least one polymer additive.

4. A composition according to claim 1, wherein the carboxylate salt according to component Bb) is an alkali metal and/or alkaline earth metal salt of a carboxylic acid having 10 to 30 carbon atoms.

5. A composition according to claim 4, wherein the carboxylate salt according to component Bb) is an alkali metal and/or alkaline earth metal salt of a resin acid or of a resin acid derivative.

6. A composition according to claim 1, wherein component B, suspended as a 10 wt. % strength suspension in distilled water, has a pH of from 7.5 to 9.

7. A composition according to claim 2, comprising as component D) a polymer prepared in bulk, solution or suspension polymerization chosen from the group consisting of vinyl (co)polymers and rubber-modified vinyl (co)polymers.

8. A composition according to claim 2, comprising
  40 to 75 parts by wt., based on the sum of components A+B+D, of component A,
  3 to 30 parts by wt., based on the sum of components A+B+D, of component B,
  0.005 to 0.3 part by wt., based on the sum of components A+B+D, of component C,
  5 to 40 parts by wt., based on the sum of components A+B+D, of component D,
  0.5 to 20 parts by wt., based on the sum of components A+B+D, of component E.

9. A composition according to claim 8, wherein components B and C are employed in a ratio of 80:1 to 800:1.

10. A composition according to claim 1, wherein component B is obtained by a process (i) wherein, in a first process step a graft base Ba.2 is prepared in emulsion polymerization,
(ii) in a second process step reacting the graft base in emulsion polymerization, with at least one vinyl monomer Ba.1 in a grafting reaction, wherein the grafting reaction is carried out at a pH of >7, and wherein at least one additive is optionally added, optionally as an aqueous emulsion and/or dispersion,
(iii) wherein in at least one of process steps (i) to (ii) a carboxylate salt Bb) is employed as an emulsifier, optionally in combination with further surface-active substances which differ from carboxylate salts Bb),
(iv) wherein the precipitation of the graft polymer latex is carried out either in a basic medium, and/or optionally under slightly acidic conditions, which do not lead to complete neutralization of basic components already present, and
(v) wherein the carboxylate salt employed as an emulsifier remains in the graft polymer during subsequent working up of the graft polymer latex and/or is only partly removed from the graft polymer.

11. A composition according to claim 1, wherein component C) is at least one compound selected from the group consisting of
ortho-phosphoric acid,
meta-phosphoric acid,
oligophosphoric acid,
phosphorous acid,
$P(O)(OH)(OR^7)(OR^8)$,
$P(O)(OH)R^7(OR^8)$,
$P(O)(OH)R^7R^8$,
$P(O)(OH)_2(OR^7)$,
$P(O)(OH)_2R^7$,
$P(OH)(OR^7)(OR^8)$,
$P(OH)(OR^7)R^8$,
$P(OH)R^7R^8$,
$P(OH)_2(OR^7)$,
$P(OH)_2R^7$
and condensation products of the same species or different species of these compounds, wherein $R^7$ and $R^8$ represent any desired identical or different organic radicals, wherein the radicals $R^7$ and $R^8$ can also be bonded to form a cyclic radical.

12. A composition according to claim 1, wherein component C) is a compound according to formula (IV)

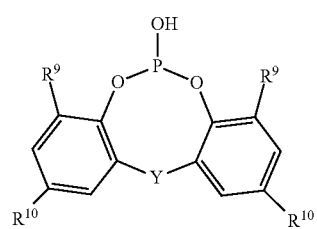

(IV)

wherein
$R^9$ and $R^{10}$ independently of one another denote $C_1$ to $C_9$-alkyl, optionally substituted $C_5$ to $C_6$-cycloalkyl, $C_6$ to $C_{10}$-aryl or $C_7$ to $C_{12}$-aralkyl, and
Y denotes S or $CZ^1Z^2$, wherein $Z^1$ and $Z^2$ independently of one another represent H, $C_1$ to $C_6$-alkyl, cyclohexenyl or cyclohexyl.

13. A composition according to claim 1, wherein component C) is at least one compound selected from the group consisting of compounds of the structure (V)

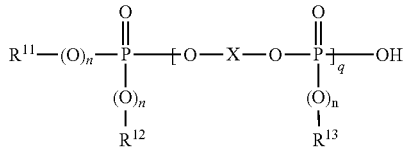

and compounds of the structure (VI)

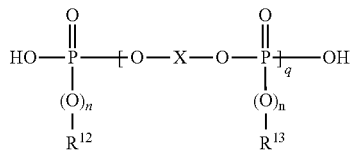

wherein
R$^{11}$, R$^{12}$ and R$^{13}$ independently of one another denote in each case optionally halogenated C$_1$ to C$_8$-alkyl, or C$_5$ to C$_6$-cycloalkyl, C$_6$ to C$_{20}$-aryl or C$_7$ to C$_{12}$-aralkyl in each case optionally substituted by alkyl and/or halogen,
n independently of one another denotes 0 or 1,
q denotes 0 to 30 and
X denotes a mono- or polynuclear aromatic radical having 6 to 30 C atoms, or a linear or branched aliphatic radical having 2 to 30 C atoms, which can be substituted by OH and can contain up to 8 ether bonds.

14. A shaped article comprising a composition according to claim 1.

15. A shaped article according to claim 14, wherein the shaped article is a part of a motor vehicle, rail vehicle, aircraft or aquatic vehicle or a film, a profile or a housing component.

16. A composition according to claim 1, which is characterized by a change in the MVR measured in accordance with ISO 1133 at 260° C. with a plunger load of 5 kg during storage of the granules at 95° C. and 100% relative atmospheric humidity for 7 days of less than 15 ml/10 min, and simultaneously is characterized by an iMVR measured in accordance with ISO 1133 at 300° C. with a plunger load of 5 kg after a holding time at the measurement temperature of 15 minutes of less than 100 ml/10 min.

* * * * *